(12) United States Patent
Ikenaga et al.

(10) Patent No.: US 12,715,333 B2
(45) Date of Patent: Aug. 25, 2026

(54) CONTROL DEVICE FOR VEHICLE

(71) Applicant: TOYOTA JIDOSHA KABUSHIKI KAISHA, Toyota (JP)

(72) Inventors: Kenta Ikenaga, Toyota (JP); Yuki Sugo, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 46 days.

(21) Appl. No.: 18/650,456

(22) Filed: Apr. 30, 2024

(65) Prior Publication Data

US 2024/0375542 A1 Nov. 14, 2024

(30) Foreign Application Priority Data

May 10, 2023 (JP) ................................ 2023-077751

(51) Int. Cl.
*B60L 58/12* (2019.01)

(52) U.S. Cl.
CPC ........... *B60L 58/12* (2019.02); *B60L 2240/12* (2013.01); *B60L 2240/54* (2013.01)

(58) Field of Classification Search
CPC ...... B60L 58/12; B60L 58/13; B60L 2240/54; B60L 2240/12
See application file for complete search history.

(56) References Cited

U.S. PATENT DOCUMENTS

2005/0077874 A1* 4/2005 Nakao ..................... B60L 58/12 320/116
2018/0261889 A1* 9/2018 Kusano ................. H01M 10/44
2024/0339853 A1* 10/2024 Kam .................. H02J 7/00714

FOREIGN PATENT DOCUMENTS

EP 1925494 A2 * 5/2008 ............. B60L 15/20
JP 2002-071360 A 3/2002
JP 2003-174738 A 6/2003
JP 2018186630 A * 11/2018
JP 2022-539977 A 9/2022
WO WO-2021003731 A1 * 1/2021 ........... H02J 7/0047

OTHER PUBLICATIONS

Machine translation of JP-2018186630-A (Year: 2018).*

* cited by examiner

*Primary Examiner* — Navid Z. Mehdizadeh
*Assistant Examiner* — Caitlin R Mccleary
(74) *Attorney, Agent, or Firm* — Oliff PLC

(57) ABSTRACT

An ECU includes a nonvolatile memory. An SOC acquisition unit acquires SOCc, which is a current SOC of a battery. A ΔSOC calculation unit calculates a difference ΔSOC (=|SOCm−SOCc|) between an SOCm (memory SOC) stored in the nonvolatile memory and the SOCc. A rewriting unit rewrites the SOCm stored in the nonvolatile memory to the SOCc, on the condition: ΔSOC>threshold value S1 during charging, ΔSOC>threshold value S2 during discharging, or ΔSOC>predetermined value α when an ignition switch is operated to switch from ON to OFF.

2 Claims, 4 Drawing Sheets

START
S10
ACQUIRE SOCc
S11
READ SOCm
S12
CALCULATE ΔSOC
S13
I/G:ON⇒OFF
?
YES
NO
S14
REWRITING REGION
?
NO
YES
S15
ΔSOC ≥ α
?
NO
YES
S16
REWRITE SOC-m
(SOC-m←SOC-c)
END

CONTROL DEVICE FOR VEHICLE

CROSS REFERENCE TO RELATED APPLICATIONS

This nonprovisional application is based on Japanese Patent Application No. 2023-077751 filed on May 10, 2023 with the Japan Patent Office, the entire contents of which are hereby incorporated by reference.

BACKGROUND

Field

The present disclosure relates to a control device for a vehicle, and more particularly, to a control device for a vehicle equipped with a battery for driving.

Description of the Background Art

Japanese Patent Laying-Open No. 2002-71360 discloses that, with respect to writing (storing) own vehicle position information in a nonvolatile memory that retains the contents of writing even when the power is shut off, writing is executed only when the vehicle is in a stopped state. As a result, it is possible to reliably store and hold the vehicle position information immediately before the power supply is shut off, without providing a power supply capable of constantly supplying electric power.

In an electrically powered vehicle, a state of charge (SOC) of a battery is used for various controls of the vehicle. It is preferable that the SOC information is stored in the nonvolatile memory so that the SOC information does not disappear even when the power supply to the control device is cut off.

The nonvolatile memory has a limitation on the number of times of rewriting (the number of times of storing) due to deterioration or the like, and when the number of times of rewriting reaches an upper limit, the SOC information may not be normally stored. Therefore, for example, when the SOC information stored (held) in the nonvolatile memory is rewritten every time the electrically powered vehicle is stopped, the number of times of rewriting of the nonvolatile memory unnecessarily increases, and as a result, there is a concern that the number of times of rewriting exceeds the upper limit.

SUMMARY

An object of the present disclosure is to reduce the number of times an SOC stored in a nonvolatile memory is rewritten.

A control device for a vehicle according to the present disclosure is a control device for a vehicle equipped with a battery for driving. The control device includes a nonvolatile memory. The control device further includes: an SOC acquisition unit that acquires a current SOC of the battery; a ΔSOC acquisition unit that acquires a ΔSOC representing a difference between a memory SOC stored in the nonvolatile memory and the current SOC; and a rewriting unit that rewrites the memory SOC stored in the nonvolatile memory to the current SOC, when the ΔSOC is larger than a predetermined value.

According to this configuration, since the memory SOC is rewritten when the difference ΔSOC between the memory SOC stored in the nonvolatile memory and the current SOC is larger than the predetermined value, the number of times the nonvolatile memory is rewritten can be reduced. In addition, the predetermined value is set to a value that is acceptable when various controls are executed, so that various controls can be performed using the memory SOC.

Preferably, the predetermined value may be set based on a vehicle speed of the vehicle.

According to this configuration, the predetermined value is set based on the vehicle speed. For example, when the vehicle speed is high such as a high speed during traveling on an expressway, the rate of decrease of the SOC is large and accordingly the ΔSOC increases. When the vehicle speed is high, the number of times rewriting is done can be reduced by increasing the predetermined value as compared with the case where the vehicle speed is low. When the vehicle speed is high (during traveling), there is a low possibility that the power supply of the control device is shut off, so that there is a low possibility that various controls are performed using the memory SOC, and therefore, even if the difference between the current SOC and the memory SOC is large, its influence is small.

Preferably, the predetermined value during charging of the battery and the predetermined value during discharging of the battery may be set to different values, respectively.

When the current SOC cannot be acquired, various controls may be performed using the memory SOC stored in the nonvolatile memory, and the memory SOC may also be used as an SOC of the battery to be displayed. When the battery is discharged and the current SOC (actual SOC) is smaller than the memory SOC, the actual dischargeable power amount is smaller than the dischargeable power amount based on the displayed memory SOC (during travelling, the actual travelable distance is shorter than the travelable distance based on the memory SOC), which may cause a disadvantage to the user.

According to this configuration, for example, the predetermined value during discharging can be set smaller than the predetermined value during charging, to lessen the disadvantage during discharging. In addition, during charging, the number of times the nonvolatile memory is written can be reduced.

Preferably, when an ignition switch is operated to switch from ON to OFF and the ΔSOC is larger than the predetermined value, the rewriting unit may rewrite the memory SOC stored in the nonvolatile memory to the current SOC.

When the ignition switch is operated to switch from ON to OFF, the memory SOC stored in the nonvolatile memory may be rewritten to the current SOC; and when the ignition switch is operated to switch to ON next time, the memory SOC may be read from the nonvolatile memory to perform various controls using the read memory SOC.

According to this configuration, when the ignition switch is operated to switch from ON to OFF and the ΔSOC is larger than the predetermined value, the nonvolatile memory is rewritten, and therefore, the number of times the memory is rewritten can be reduced.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
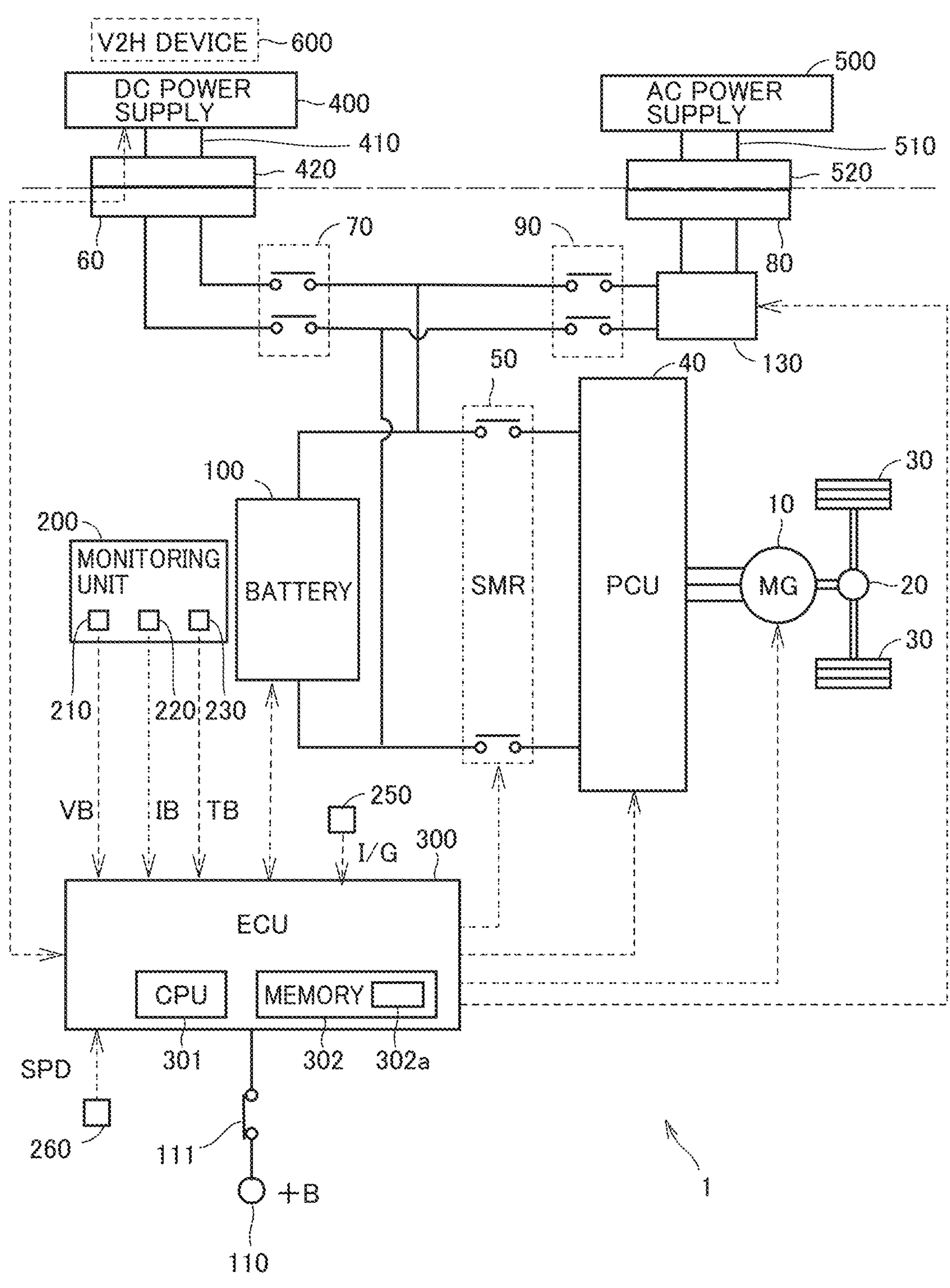
FIG. 1 is an overall configuration diagram of a vehicle according to the present embodiment.

Hereinafter, embodiments of the present disclosure will be described in detail with reference to the drawings. In the drawings, the same or corresponding parts are denoted by the same reference numerals, and the description thereof will not be repeated.

FIG. 1 is an overall configuration diagram of a vehicle according to the present embodiment. In the present embodiment, vehicle 1 is, for example, a battery electric vehicle. The vehicle 1 includes a motor generator (MG) 10 which is a rotary electric machine, a power transmission gear 20, drive wheels 30, a power control unit (PCU) 40, a system main relay (SMR) 50, a battery 100, a monitoring unit 200, and an electronic control unit (ECU) 300 which is an example of a control device.

The MG 10 has a function as an electric motor and a function as a generator. The output torque of the MG 10 is transmitted to the drive wheels 30 via a power transmission gear 20 including a speed reducer, a differential gear, and the like.

During braking of the vehicle 1, the MG 10 is driven by the drive wheels 30, and the MG 10 operates as a generator. Thus, the MG 10 also functions as a braking device that performs regenerative braking to convert kinetic energy of the vehicle 1 into electric power. The regenerative electric power generated by the regenerative braking force in the MG 10 is stored in the battery 100. The PCU 40 is a power conversion device that bidirectionally converts power between the MG 10 and the battery 100. The SMR 50 is electrically connected to a power line connecting the battery 100 and the PCU 40, and when the SMR 50 is closed (ON), power is exchanged between the battery 100 and the PCU 40.

The battery 100 stores electric power for driving the MG 10. The battery 100 is a rechargeable DC power supply (secondary battery), and is configured by, for example, stacking a plurality of unit cells (battery cells) and electrically connecting them in series.

The monitoring unit 200 includes a voltage sensor 210 that detects a voltage VB of the battery 100, a current sensor 220 that detects a current IB input to or output from the battery 100, and a temperature sensor 230 that detects a temperature TB of the battery 100.

The vehicle 1 includes a DC inlet 60. The DC inlet 60 is configured to be connectable to a connector 420 provided at a tip of a charging cable 410 of an external DC power supply (charging facility) 400. When the charging relay 70 is closed, external charging (rapid charging) of the battery 100 is executed. Note that the DC inlet 60 may be connected to a V2H device 600 capable of external discharge (power supply) from the battery 100 in addition to external charging.

The vehicle 1 includes an AC inlet 80. The AC inlet 80 is configured to be connectable to a connector 520 provided at a tip of a charging cable 510 of an external AC power supply (charging facility) 500. When the charging relay 90 is closed, external charging (normal) of the battery 100 is performed using the in-vehicle charger 130.

The ECU (control device) 300 includes CPU (Central Processing Unit) 301 and a memory (For example, it includes a ROM (Read Only Memory), a RAM (Random Access Memory), and the like.) 302. The memory 302 includes a rewritable nonvolatile memory (for example, flash memory) 302*a*. ECU 300 is operated by power supplied from auxiliary battery 110 via power supply relay 111. ECU 300 controls each device such that vehicle 1 is in a desired state based on a signal received from monitoring unit 200, a signal (For example, the vehicle speed SPD detected by the vehicle speed sensor 260, the accelerator pedal position, and the like are calculated.) from various sensors, and information such as a map and a program stored in memory 302. For example, ECU 300 calculates the SOC of battery 100 based on a signal received from monitoring unit 200, and controls charging and discharging of battery 100 using this SOC. The ON/OFF state of the ignition switch (power switch) 250 is input to the ECU 300.

Figure 2:
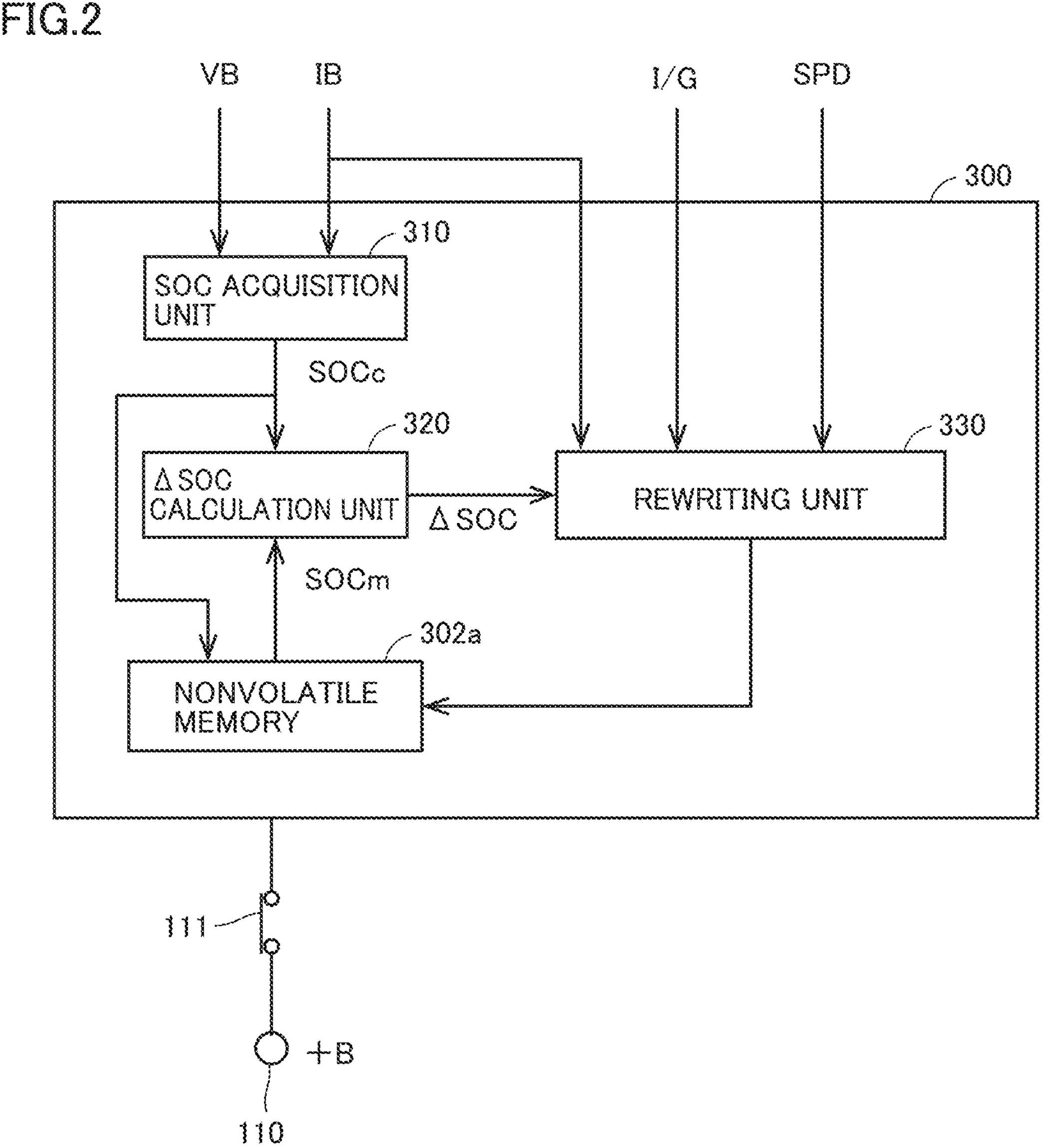
FIG. 2 is a functional block diagram of an ECU.

FIG. 2 is a diagram illustrating functional blocks configured in ECU 300 in the present embodiment. SOC acquisition unit 310 acquires SOCc (current SOC), which is the current SOC of battery 100, from voltage VB and current IB. For example, the SOCc may be calculated by combining an open circuit voltage (OCV) method and a coulomb current method. When the monitoring unit 200 is BMS (Battery Management System), the SOCc may be calculated in the EMS (monitoring unit 200), and the SOCc calculated in the BMS may be acquired.

The ΔSOC calculation unit 320 reads SOCm (memory SOC), which is the SOC stored in the nonvolatile memory 302*a*, and calculates ΔSOC, which is the difference between SOCm and SOCc ($\Delta SOC = |SOCm - SOCc|$).

Figure 3:
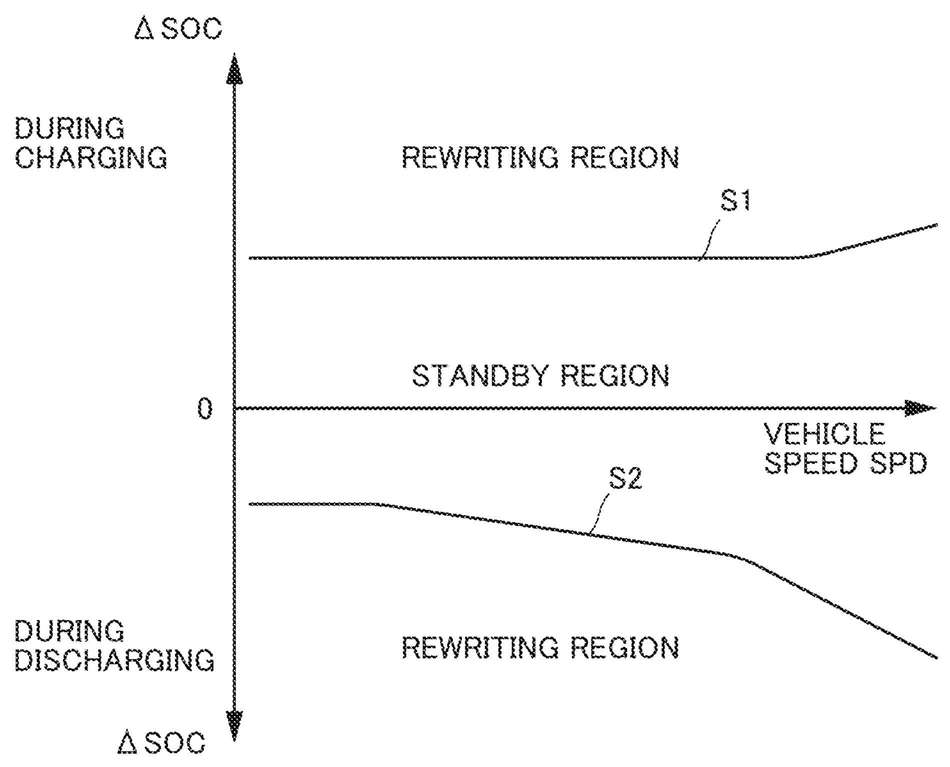
FIG. 3 is an example of a map showing a rewriting region.

The rewriting unit 330 determines whether or not rewriting of the SOCm is necessary, and if rewriting is necessary, rewrites the SOCm stored in the nonvolatile memory 302*a*. FIG. 3 shows an example of a map showing a rewriting region. In FIG. 3, the vertical axis represents ΔSOC, which represents a larger value in the vertical direction with respect to 0. A region above 0 is a rewriting region at the time of charging, and a region below 0 is a rewriting region at the time of discharging. When the battery 100 is charged, a region in which ΔSOC is larger than the threshold value S1 is set as the rewriting region. On the other hand, at the time of discharging, a region in which ΔSOC is larger than the threshold value S2 is set as the rewriting region. As shown in FIG. 3, the threshold values S1 and S2 are set to larger values as the vehicle speed SPD becomes higher. When the vehicle speed SPD is the same, the threshold value S2 (during discharging) is set to be smaller than the threshold value S1 (during charging). The threshold values S1 and S2 correspond to an example of the "predetermined value" of the present disclosure.

For example, the rewriting unit 330 determines whether the battery is charged or discharged from the direction of the current IB (the sign of the current IB) detected by the current sensor 220. Then, based on the ΔSOC at the time of charging and the vehicle speed SPD, the rewriting unit 330 determines that the region is the rewriting region when the ΔSOC is larger than the threshold value S1, and determines that the region is the standby region when the ΔSOC is equal to or smaller than the threshold value S1, using the map of FIG. 3. Based on the ΔSOC at the time of discharging and the vehicle speed SPD, the rewriting unit 330 determines that the region is the rewriting region when the ΔSOC is larger than the threshold value S2, and determines that the region is the standby region when the ΔSOC is equal to or smaller than the threshold value S2, using the map of FIG. 3. When it is determined that the region is the rewriting region, the rewriting unit 330 rewrites the SOCm stored in the nonvolatile memory 302*a* to the SOCc.

When the ignition switch 250 is operated to switch from ON to OFF and ΔSOC is larger than the predetermined value α, the rewriting unit 330 rewrites the SOCm stored in the nonvolatile memory 302*a* to the SOCc.

Figure 4:
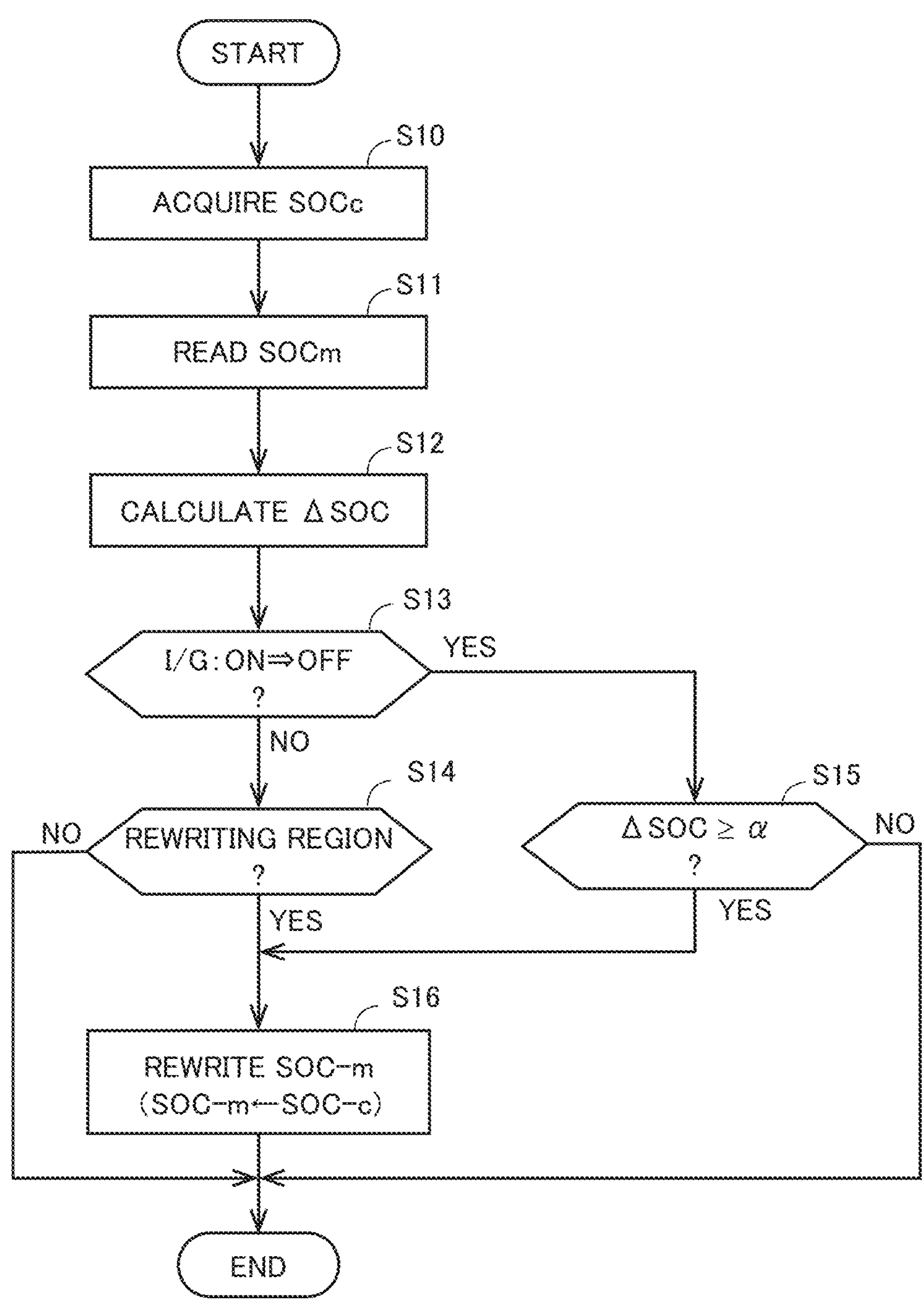
FIG. 4 is a flowchart showing an example of rewriting processing executed in the ECU.

FIG. 4 is a flowchart showing an example of rewriting processing executed in the ECU 300. This flowchart is repeatedly executed while the activation of the ECU 300 is permitted (For example, the ignition switch is in an ON state, the battery 100 is being externally charged, and the battery is being externally discharged (powered).). In step (hereinafter, abbreviated as "S") 10, ECU 300 acquires SOCc (current SOC) of battery 100. The ECU 300 may calculate the SOCc from the voltage VB and the current IB, and may acquire the SOCc calculated by the monitoring unit 200 (BMS) when the monitoring unit 200 is a BMS.

In S11, the ECU 300 reads the SOCm (memory SOC) from the nonvolatile memory 302*a*. In S12, the ECU 300 calculates ΔSOC (=|SOCm−SOCc|).

In S13, the ECU 300 determines whether or not the ignition switch 250 is operated from ON to OFF. In S13, when the ignition switch 250 is operated from ON to OFF and an affirmative determination is made, the process proceeds to S15, and when a negative determination is made, the process proceeds to S14.

In S14, the ECU 300 uses the map of FIG. 3 to determine whether or not it is a rewriting region based on ΔSOC and the vehicle speed SPD. When the battery 100 is charged, if ΔSOC is equal to or greater than the threshold value S1, it is determined to be a rewriting region, and the process proceeds to S16. In the case of discharging, when ΔSOC is equal to or larger than the threshold value S2, it is determined to be a rewriting region, and the process proceeds to S16. When it is in the standby region, a negative determination is made, and the current routine is ended.

In S15, the ECU 300 determines whether or not ΔSOC is equal to or greater than the predetermined value α, and if an affirmative determination is made, the process proceeds to S16. If a negative determination is made in S15, the current routine is ended.

In S16, the ECU 300 rewrites the SOCm stored in the nonvolatile memory 302*a* to the SOCc. In a case where an affirmative determination is made in S13, the ECU 300 may shut off the power supply relay 111 and shut off the power supply to the ECU 300 after the processing in S15 and S16 ends.

According to the present embodiment, when the difference ΔSOC between the SOCm (memory SOC) and the SOCc (current SOC) stored in the nonvolatile memory 302*a* is larger than a predetermined value (threshold values S1 and S2, predetermined value α), the SOCm is rewritten, so that the number of times of rewriting of the nonvolatile memory can be suppressed. In addition, if the predetermined value is set to a value that is acceptable when various types of control are executed, various types of control using the SOCm can be performed.

According to the present embodiment, the threshold values S1 and S2 are set based on the vehicle speed SPD, and when the vehicle speed SPD is high, the threshold values S1 and S2 are set to be larger than when the vehicle speed SPD is low. When the vehicle speed SPD is high, such as when traveling on an expressway, the decrease speed of the SOCc increases and the ΔSOC increases, but the number of times of rewriting can be reduced by increasing the threshold values S1 and S2 as compared with the case where the vehicle speed is low. In addition, when the vehicle speed SPD is high (during traveling), the auxiliary battery 110 is not removed, there is a low possibility that the amount of power stored in the auxiliary battery 110 is exhausted, and there is a low possibility that the power supply of the ECU 300 is shut off. Therefore, there is a low possibility that various controls using the SOCc are interrupted, and even if the deviation between the SOCc and the SOCm is large, the influence thereof can be reduced.

According to the present embodiment, threshold value S1 (threshold value at the time of charging) and threshold value S2 (threshold value at the time of discharging) are set to different values, and threshold value S2 is set to be smaller than threshold value S1. When the SOCc cannot be acquired, the ECU 300 performs various controls using the SOCm stored in the nonvolatile memory 302*a*, and may use the SOCm as the SOC display of the battery 100. If the SOCc (actual SOC) is smaller than the SOCm at the time of discharging, the actual dischargeable power amount becomes smaller than the dischargeable power amount according to the displayed SOCm (During travel, the actual travelable distance is shorter than the travelable distance based on SOCm.), and there is a concern that a disadvantage is caused to the user. By setting the threshold value S2 to be smaller than the threshold value S1, the disadvantage at the time of discharging can be reduced, and at the time of charging, since the threshold value S1 is large, it is possible to reduce the number of times of rewriting of the nonvolatile memory 302*a*.

According to the present embodiment, when the ignition switch 250 is operated from ON to OFF and ΔSOC is larger than the predetermined value α, the SOCm stored in the nonvolatile memory 302*a* is rewritten to the SOCc. Thus, the number of times of rewriting of the nonvolatile memory 302*a* can be reduced as compared with the case where the SOCm is rewritten every time the ignition switch 250 is operated from ON to OFF.

In the above-described embodiment, the ECU 300 that controls each device includes the functional block of FIG. 2, and executes the process of the flowchart of FIG. 4. However, a battery ECU or a BMS (monitoring unit 200) that controls charging and discharging of the battery 100 may include a nonvolatile memory and perform these functions. The vehicle 1 may be an electrically powered vehicle, and may be PHEV (Plug-in Hybrid Electric Vehicle) or HEV (Hybrid Electric Vehicle) including an internal combustion engine, or FCEV (Fuel Cell Electric Vehicle).

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A control device for a vehicle equipped with a battery for driving, the control device comprising:

a nonvolatile memory; and control circuitry including at least one processor, the at least one processor being configured to:

acquire a current SOC of the battery;

acquire a ΔSOC representing a difference between a memory SOC stored in the nonvolatile memory and the current SOC; and rewrite the memory SOC stored in the nonvolatile memory to the current SOC, when the ΔSOC is larger than a predetermined value, wherein the predetermined value is set based on both a vehicle speed of the vehicle and whether the battery is charging or discharging, the predetermined value is set to a larger value as the vehicle speed becomes higher, and for a same vehicle speed, the predetermined value during charging is set to be larger than the predetermined value during discharging.

2. The control device for the vehicle according to claim 1, wherein the at least one processor is configured to, when an ignition switch is operated to switch from ON to OFF and the ΔSOC is larger than the predetermined value, rewrite the memory SOC stored in the nonvolatile memory to the current SOC.

* * * * *